United States Patent
Hubel et al.

(10) Patent No.: US 7,200,264 B2
(45) Date of Patent: Apr. 3, 2007

(54) WHITE POINT ESTIMATION USING COLOR BY CONVOLUTION

(75) Inventors: Paul M. Hubel, Mt. View, CA (US);
Graham D. Finlayson, Taverham (GB);
Steven D. Hordley, Norwich (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 965 days.

(21) Appl. No.: 10/120,180

(22) Filed: Apr. 10, 2002

(65) Prior Publication Data

US 2003/0194125 A1 Oct. 16, 2003

(51) Int. Cl.
*G06K 9/00* (2006.01)

(52) U.S. Cl. .................. 382/167; 382/162; 382/272; 382/274; 348/223.1

(58) Field of Classification Search .............. 382/168, 382/274, 156, 272; 345/596, 690–697; 358/516, 358/522, 3.01, 3.02, 3.09, 3.23, 518–523; 348/223.1, 655
See application file for complete search history.

(56) References Cited

U.S. PATENT DOCUMENTS

| | | | | | |
|---|---|---|---|---|---|
| 5,485,284 | A | * | 1/1996 | Shono et al. | 358/504 |
| 5,815,291 | A | * | 9/1998 | Shono et al. | 358/504 |
| 6,038,339 | A | * | 3/2000 | Hubel et al. | 382/162 |
| 2002/0167615 | A1 | * | 11/2002 | Spitzer et al. | 348/679 |
| 2003/0035156 | A1 | * | 2/2003 | Cooper | 358/516 |
| 2003/0053690 | A1 | * | 3/2003 | Trifonov et al. | 382/168 |

* cited by examiner

*Primary Examiner*—Kanjibhai Patel
*Assistant Examiner*—Ali Bayat

(57) ABSTRACT

The probability of a chromaticity being a white point of image scene illumination is estimated by convolving a chromaticity histogram with a function of log probability distribution of chromaticities under an illuminant.

26 Claims, 3 Drawing Sheets

WHITE POINT ESTIMATION USING COLOR BY CONVOLUTION

BACKGROUND

A human observer can view a scene under a variety of different illuminants, yet still see the same range of colors. For example, a white piece of paper remains resolutely white independent of the color of light under which it is viewed. This psycho-visual effect is referred to as "color constancy."

In contrast, color imaging systems are less color constant in that they will often infer the color of the scene illuminant incorrectly. For example, a digital camera captures an image of an indoor scene under a reddish tungsten illumination. Since the light entering the camera is this tungsten illumination reflected from the objects in the scene, all objects in the scene will be recorded as redder than they would be had the illuminant been a whitish fluorescent light. This change in color is at odds with what a human observes (the human perception of the colors of the objects is relatively stable, even if the illuminant is switched between tungsten and fluorescent).

Color appearance models can be used to ensure color constancy in the images produced by the imaging systems. That is, the color appearance models can ensure that the colors in the scene appear the same regardless of the illumination.

However, these models depend upon knowledge of the white point of the image scene. If the imaging system does not measure the white point directly, the white point is estimated.

SUMMARY

According to one aspect of the present invention, the probability of a chromaticity being a white point of image scene illumination is estimated by convolving a chromaticity histogram with a function of log probability distribution of chromaticities under an illuminant. Other aspects and advantages of the present invention will become apparent from the following detailed description, taken in conjunction with the accompanying drawings, illustrating by way of example the principles of the present invention.

DETAILED DESCRIPTION

Figure 1:
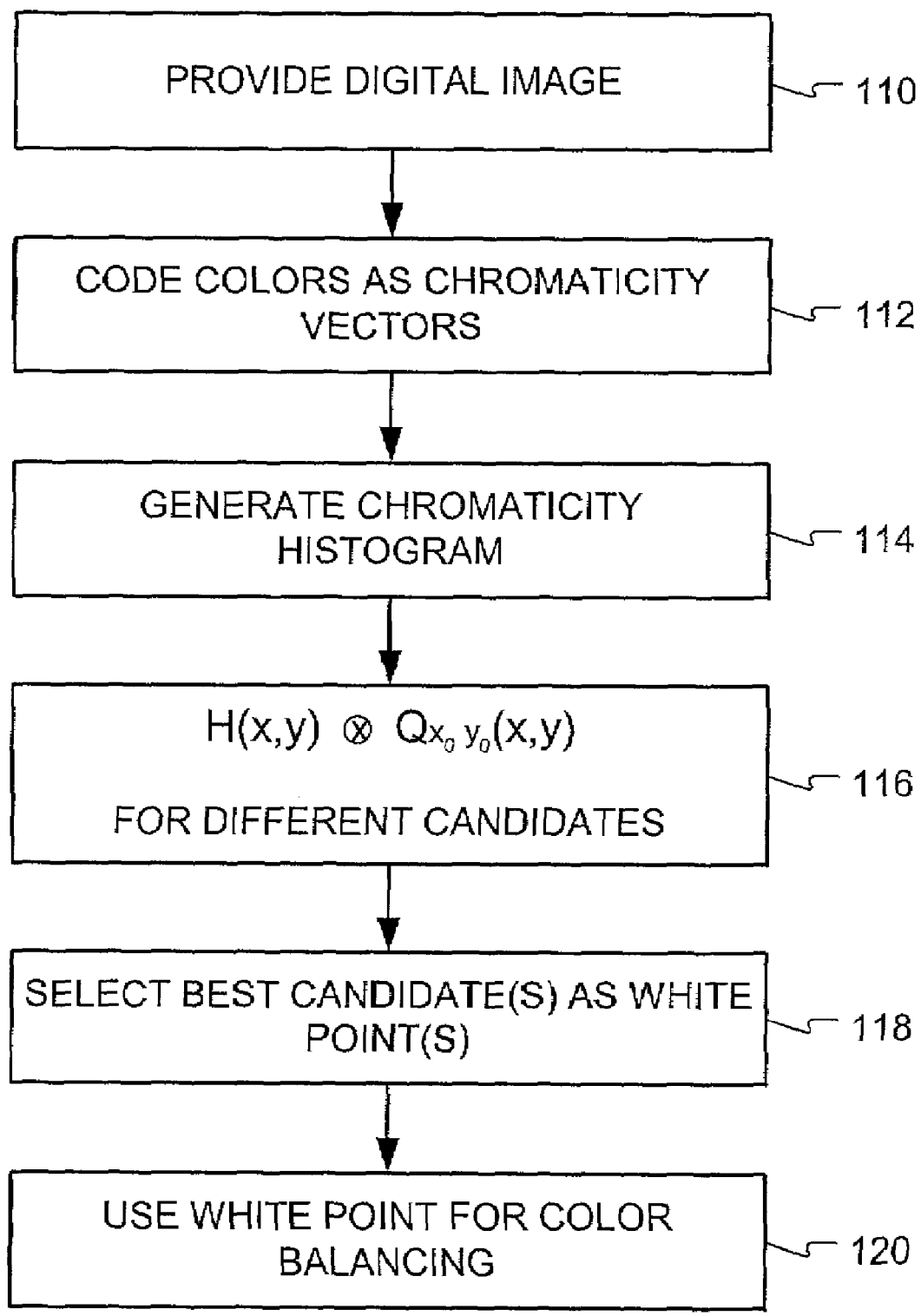
FIG. 1 is an illustration of an image processing method in accordance with an embodiment of the present invention.

As shown in the drawings for purposes of illustration, the present invention is embodied in a method and imaging system for estimating the white point of a scene in a digital image. The white point can be estimated without any prior knowledge about the statistical nature of lights and surfaces, or the response function of the sensor array that generates the image.

Reference is made to FIG. 1. A scene is provided by a digital camera or other imaging system having a sensor array (110). The scene is illuminated by one or more sources of light. The light provided by the one or more light sources will be referred to collectively as an "illuminant."

The sensor array outputs a sensor image that can be described in terms of surface reflectance of the objects in the scene, spectral power distribution of the illuminant, and spectral sensitivity of the sensors in the array. The sensor image is represented as an array of pixels. In the spatial domain, each pixel is represented by an n-bit word. In a typical 24-bit word representing RGB color space, for instance, eight bits represent a red component, eight bits represent a green component and eight bits represent a blue component.

Each pixel in the image is coded as a two-dimensional chromaticity vector (112). Resulting is a set of chromaticity vectors for the image. The chromaticity vector of a pixel may be represented by $$\left[ x = \frac{x_1}{x_3}, y = \frac{x_2}{x_3} \right],$$

where $x_1$, $x_2$ and $x_3$ are color space components of the pixel. If the sensor array has red (R), green (G), and blue (B) sensor elements, the chromaticity vector (x,y) may be represented as [R/G, B/G], which corresponds to any sensor response (sR, sG, sB) for any scalar s. The green component is preferred in the denominator because it usually has the strongest signal.

For these chromaticity vectors, the relationship between the chromaticity vector ($x^0$, $y^0$) under a first illuminant and the chromaticity vector ($x^c$, $y^c$) under a second illuminant chromaticity may be modeled as follows:

$$\begin{pmatrix} x^c \\ y^c \end{pmatrix} = \begin{pmatrix} \alpha & 0 \\ 0 & \gamma \end{pmatrix} \begin{pmatrix} x^0 \\ y^0 \end{pmatrix}$$

In this model, the chromaticity vector ($x^0$, $y^0$) under the first illuminant is related to the chromaticity vector ($x^c$, $y^c$) under the second illuminant by a simple mapping function—a diagonal matrix. This model will be referred to as a diagonal model of change.

Taking the logarithms of the chromaticity vectors yields the following:

$$\begin{pmatrix} \log(x^c) \\ \log(y^c) \end{pmatrix} = \begin{pmatrix} \log(\alpha) \\ \log(\gamma) \end{pmatrix} + \begin{pmatrix} \log(x^0) \\ \log(y^0) \end{pmatrix}$$

In log-chromaticity space, the co-ordinates of a single surface imaged under two different lights are related by a simple additive shift, and all chromaticity values are changed by a fixed translation (assuming that the sensor spectral sensitivity and the surface reflectivities remain constant).

Define ($x_c$,$y_c$) as the chromaticity vector of an illuminant, and $Px_c,y_c(x,y)$ as the log-probability of observing the chromaticity vector (x,y) under the illuminant with white point ($x_c$,$y_c$). Since all chromaticity values in log-chromaticity space change by a fixed translation, the probability distribution of chromaticities under illuminant ($x_0$,$y_0$) and the corresponding chromaticities under another arbitrary illuminant $(x_c, y_c)$ may be characterized as:

$$Px_c, y_c(x,y) = Px_0, y_0(x-(x_c-x_0), y-(y_c-y_0)).$$

Thus if the distribution of image colors can be determined under a known illuminant $(x_0, y_0)$, the distribution of image colors can be determined under another arbitrary illuminant $(x_c, y_c)$.

Figure 2:
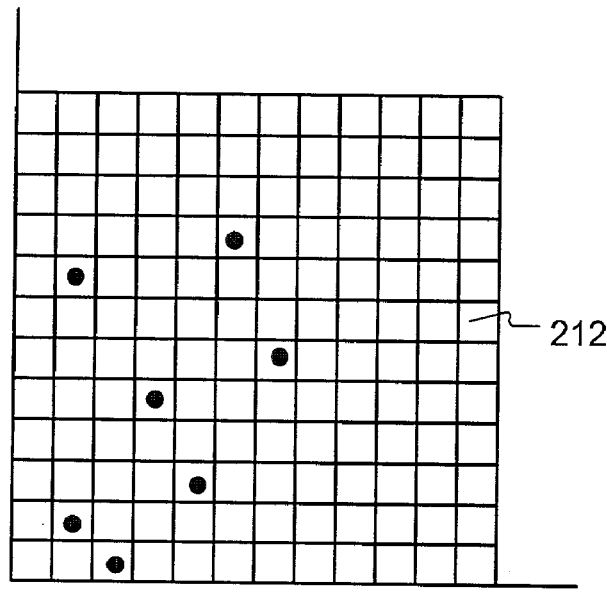
FIG. 2 is an illustration of a chromaticity histogram.

A chromaticity histogram is generated from the set of chromaticity vectors (114). The chromaticity space is divided into N×N bins 212 (see FIG. 2). The bins may be equally sized. The histogram $H(x,y)$ may be generated by counting the number of chromaticity vectors that fall into each bin. Thus, $$H(x, y) = \begin{cases} 1, & \text{if } (x, y) \in I \\ 0, & \text{otherwise} \end{cases}$$

where I represents the set of chromaticity vectors found in the image. Resulting is a discrete approximation to the distribution of image colors under the illuminant. The accuracy of the approximation can be increased by reducing bin size (increasing the number of bins).

Given the chromaticity histogram of the image scene and the probability distribution of the known illuminant, the following log-likelihood can be determined:

$$l(x_0, y_0) = \sum_x \sum_y H(x, y) P_{x_0, y_0}(x, y)$$

where $l(x_0, y_0)$ is the log-likelihood that the illuminant with white point $(x_0, y_0)$ is the scene illuminant (assuming that $x_0, y_0$ is at the origin of the log-chromaticity space). More generally, the log-likelihood that the illuminant with white point $(x_i, y_j)$ is the scene illuminant may be expressed as $$l(x_i, y_i) = \sum_x \sum_y H(x, y) P_{x_0, y_0}(x - x_i, y - y_j).$$

Now let $Q_{x_0, y_0}(x,y) = P_{x_0, y_0}(-x, -y)$. The log-likelihood can be rewritten as $$l(x_i, y_i) = \sum_x \sum_y H(x, y) Q_{x_0, y_0}(x_i - x, y_j - y) = H(x, y) \otimes Q_{x_0, y_0}(x, y).$$

The log likelihood $l(x_i, y_j)$ is determined as $H(x,y) \otimes Q_{x_0, y_0}(x,y)$ for different candidates $(x_i, y_j)$. Thus for each candidate chromaticity vector $(x_i, y_j)$ a log likelihood is determined by convolving the log image chromaticity histogram with log probability distribution of chromaticities under the known illuminant (116).

A wide selection of candidate chromaticity vectors $(x_i, y_j)$ is available. However, the selection may be narrowed by prior knowledge of probabilities of plausible illuminants. For example, some chromaticities correspond to colors such as purple, for which no illuminant colors exist.

A candidate illuminant is selected as the white point of the illuminant (118). The selection may be based on maximum likelihood, mean likelihood, a local area, or other selection criteria.

More than one candidate may be selected because a scene might have more than one white point. For example, a digital camera captures an image of an indoor scene. A first portion of the scene is illuminated by reddish light from a tungsten flash, and a second portion is illuminated by a whitish fluorescent light. A third portion of the scene includes a window, through which an outdoor scene is visible. The outdoor scene is illuminated by bluish light. The vectors having the best probabilities may be selected as multiple white points for such a scene.

Thus a white point can be estimated without any prior knowledge about the statistical nature of lights and surfaces, or the response function of the sensor array of the imaging device. One need only determine the expected distribution for a single illuminant.

The probability distribution of chromaticities may be based on actual data. For instance, if the manufacturer of the imaging device publishes curves for sensor array sensitivities, a distribution based on the sensor array sensitivity curves may be used. If the imaging device manufacturer does not provide the curves, the imaging device may be used to determine the curves. A probability distribution may be computed from these curves.

The probability distribution of chromaticities may be determined by using an imaging device to record its responses to many different surfaces under a single illuminant and from those responses derive an estimate of the distribution of colors. For example, a Gaussian distribution could be fit to the measured responses. This method could be applied on a per-device basis.

In lieu of a probability distribution of chromaticities based on measured responses, the probability distribution of chromaticities may be estimated. The chromaticity co-ordinates used in these comparisons are a transformation of sensor array responses. Consider a probability density function that assumes uniformly distributed (R,G,B) vectors and makes no assumptions about which reflectances or RGB vectors occur in the image. This function will be referred to as the "Maximum Ignorance" function. For any camera, these responses fall within a finite range: a typical digital camera will produce 8-bit responses, thus the range is from 0 to 255. The sensor responses can be scaled to fit between the finite interval [0, 1]. Without further information, it is reasonable to assume that the responses are independently and uniformly distributed on this interval. Therefore, (R, G, B) vectors can be treated as three independent, uniformly distributed random variables:

$R \sim U[0,1]$ $G \sim U[0,1]$ $B \sim U[0,1]$

That is (R, G, B) vectors are distributed uniformly throughout the unit cube. Chromaticities are calculated from these (R, G, B) vectors as x=R/G and y=B/G. Under this transformation many different (R, G, B) vectors are projected to the same chromaticity: in particular, any response vector of the form (sR, sG, sB) (where $s \in [0,1]$) projects to the unique chromaticity (log(R/G),log(B/G)). Geometrically these equivalent (R, G, B) vectors lie on a line segment in the RGB cube. One end of this line is the origin (0, 0, 0) and the other end lies somewhere on the surface of the RGB space cube.

Determining the probability of observing a given chromaticity co-ordinate is equivalent to determining how likely it is to observe an (R, G, B) vector on the corresponding line segment. Since the (R, G, B) vectors are assumed to be independently and uniformly distributed, this probability is proportional to the length of the line segment: the probability of observing any (R, G, B) vector is fixed, and the total probability of observing any (R, G, B) vector on the line is this probability integrated over the length of the line.

Line segments corresponding to different chromaticities are not of equal length. For example, the segment corresponding to the chromaticity (0, 0) is a line in the direction (1,1,1). The length of this segment within the unit cube is $\sqrt{3}$, and all other line segments within the cube are less than $\sqrt{3}$. This implies that the chromaticity vector (0,0) is the most probable, and that neutral colors occur most often. In general, given a chromaticity value $(x_i, y_j)$, its corresponding line segment lies in the direction $(e^{x_i}, 1, e^{y_j})$. This line intersects the unit cube at a point $p_{ij}$:

$$p_{ij} = \frac{1}{\max(e^{x_i}, 1, e^{y_j})} \begin{pmatrix} e^{x_i} \\ 1 \\ e^{y_j} \end{pmatrix}$$

It follows that the probability density function for chromaticity co-ordinates is proportional to the length of $p_{ij}(x,y)$. Thus $p_{ij}(x_i, y_j) \propto f(x_i, y_j)$, where $f(\circ)$ is a function that determines the length of the line segment corresponding to chromaticity vector $(x_i, y_j)$.

Figure 3:
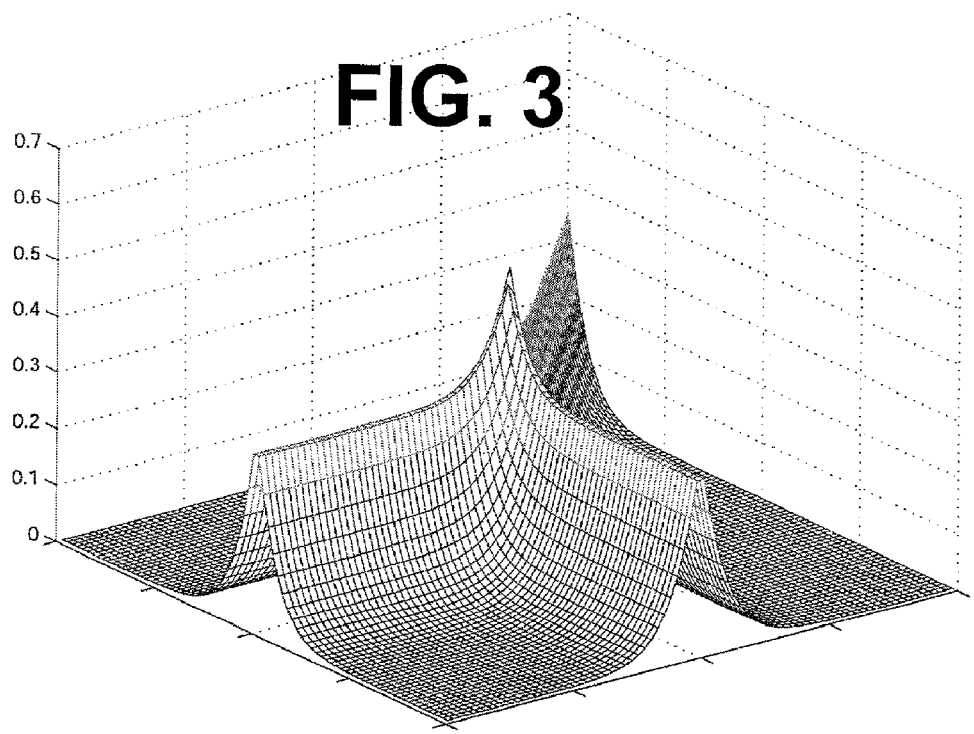

FIG. 3 illustrates this joint probability density function $p_{ij}(x,y)$. The function $p_{ij}(x,y)$ has a single peak at chromaticity (0, 0) which corresponds to an (R, G, B) in the direction (1,1,1)—the main diagonal, and longest vector in the unit cube. Other lines of constant intensity (which thus project to a single chromaticity) are shorter than this diagonal and thus their corresponding chromaticity has a smaller value in the probability density function.

Figure 4:
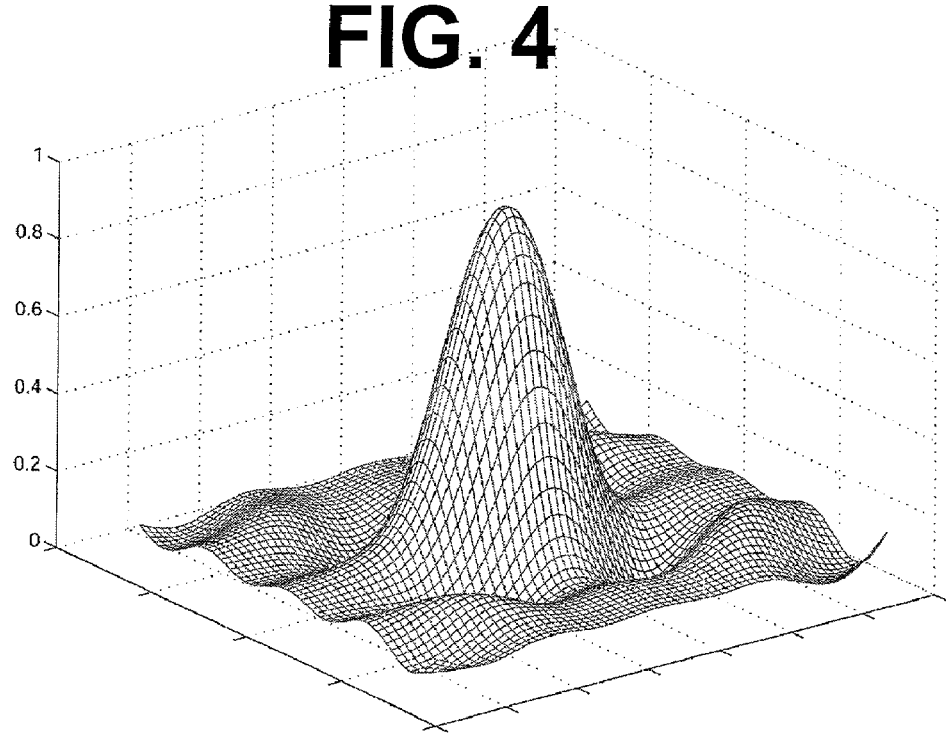
FIGS. 3 and 4 are illustrations of different distributions for an illuminant.

Compare the distribution of FIG. 3 to the distribution of FIG. 4. The distribution of FIG. 4 is derived from a set of standard surface reflectance functions for a sensor array balanced such that its responses across the sensor array are equal for a white surface viewed under a white illuminant. The distributions may be calculated from the product of sensor measurement, the illuminant, and the set of standard surface reflectances. The two distributions are similar in that they both peak at the achromatic point, however their general shapes are quite different.

The estimated white point may be supplied to an application that makes use of the white point (120). One exemplary application is a computer vision program that uses the color of an object to recognize that object in a scene. The white point is used to ensure that two objects with different reflectance properties do not produce the same response a camera's sensor array in the event that the illuminant changes.

Another exemplary application is image reproduction. A color appearance model is used to correct the sensor image for changes in illuminant. As a result, colors in the image appear constant under different illuminants. Exemplary color appearance models are disclosed in von Kries, "Chromatic adaption", Festschrift der Albrecht-Lud-wig-Universitat, 1902; Colourimetry, 2nd ed., CIE Publication No. 15.2, Central Bureau of the CIE, Paris, 1986; M. D. Fairchild and R. S. Burns, "Image colour appearance colour specification through extension of CIELAB", Colour Research and Applications, 18, pp. 178–190, 1993; R. W. G. Hunt, "A Model of Colour Appearance for predicting colour appearance in various viewing conditions", Colour Research and Applications, 12, pp. 297–314, 1987; and R. W. G. Hunt, "Revised colour appearance model for related and unrelated colours", Colour Research and Applications, 16, pp. 146–165, 1991.

In another application, the white point may be used to control data from a pre-exposure data set. For example, the white point may be used to control gain in the color channels of a sensor array as data is being clocked out of the sensor array. In this manner the white point may be used to balance colors in a captured image as the image is being produced by the sensor array.

Figure 5:
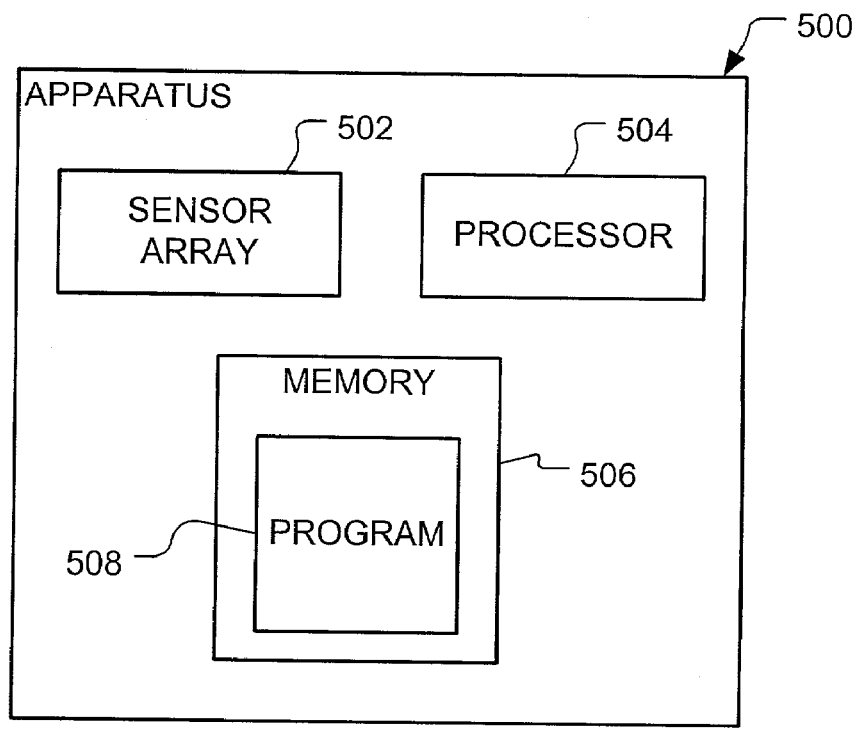
FIG. 5 is an illustration of an imaging device in accordance with an embodiment of the present invention.

Reference is now made to FIG. 5, which shows an apparatus 500 including a sensor array 502, a processor 504, and memory 506. Stored in the memory 506 is a program 508 that, when executed, instructs the processor 504 to process an image captured by the sensor array 502. The image is processed according to the method of FIG. 1. The apparatus 500 may be a digital camera, a video camera, etc.

The present invention is not limited to an apparatus including a sensor array. The apparatus may be a computer, a printer, a photo finishing system, etc.

The digital images are not limited to images captured by sensor arrays. For example, a digital image may be a computer-generated image that was formed using one or more computer-simulated light sources.

The apparatus is not limited to the general-purpose processor and memory shown in FIG. 5. Other hardware implementations may be used to carry out the method of FIG. 1. For example, the apparatus may include a processor based on a state machine or other dedicated processor.

Although the present invention was described in connection with RGB space, it is not so limited. Other usable color spaces include CMY, CMYG, $Yc_bc_r$, and Lab.

The present invention is not limited to a binary chromaticity histogram. The histogram may have values other than 0 and 1. For example, the chromaticity histogram may have values between 0 and 1, it may have values between 1 and 255, etc.

The present invention is not limited to the specific embodiments described above. Instead, the present invention is construed according to the claims that follow.

The invention claimed is:

1. A method comprising:
   estimating the probability of a chromaticity being a white point of image scene illumination in a digital image, including computing $H(x,y) \otimes Q_{x_0,y_0}(x,y)$; and
   using the computation to perform color balancing in the digital image.

2. A method of determining a white point of scene illumination, the method comprising determining a log likelihood by convolving a chromaticity histogram with a function of log probability distribution of chromaticities under an illuminant.

3. The method of claim 2, wherein different log likelihoods are estimated for different vectors (x,y), each log likelihood computed as $H(x,y) \otimes Q_{x_0,y_0}(x,y)$.

4. The method of claim 3, wherein the function $Q_{x_0,y_0}(x,y)$ incorporates prior knowledge of at least one of sensor array sensitivities and surface reflectants.

5. The method of claim 3, wherein the function $Q_{x_0,y_0}(x,y)$ is estimated as a non-uniform distribution of chromaticities.

6. The method of claim 3, wherein a Maximum Ignorance function is used to estimate the function $_{x_0,y_0}(x,y)$.

7. The method of claim 3, wherein H(x,y) is determined from chromaticity vectors, each component of a chromaticity vector being a ratio, each ratio having a single color space component in the numerator and a single color space component in the denominator.

8. The method of claim 3, wherein H(x,y) is determined from chromaticity vectors represented as [x=x1/x3, y=x2/x3], where x1, x2 and x3 are color space components of pixels.

9. The method of claim 3, wherein different log likelihoods are estimated for different vectors (x,y), each log likelihood computed as $H(x,y) \otimes Q_{x_0,y_0}(x,y)$.

10. The method of claim 9, wherein the vector having the best probability is selected as the white point.

11. The method of claim 9, wherein the vectors having the best probabilities are selected as multiple white points.

12. The method of claim 9, wherein the different vectors are based on prior knowledge of probabilities of plausible illuminants.

13. The method of claim 3, further comprising supplying the white point to an application, and using the application and the white point for color balancing.

14. Apparatus comprising a processor for computing at least one log likelihood probability of a chromaticity being a white point of image scene illumination in a digital image, each probability computed by convolving a chromaticity histogram with a function of log probability distribution of chromaticities under an illuminant.

15. The apparatus of claim 14, further comprising a sensor array for generating the digital image.

16. The apparatus of claim 15, wherein the apparatus is a digital camera.

17. The apparatus of claim 14, wherein the function incorporates prior knowledge of at least one of sensor array sensitivities and surface reflectants.

18. The apparatus of claim 14, wherein the function is estimated as a non-uniform distribution of chromaticities.

19. The apparatus of claim 14, wherein a Maximum Ignorance function is used to estimate the function.

20. The apparatus of claim 14, wherein the chromaticity histogram is determined from chromaticity vectors, each component of a chromaticity vector being a ratio, each ratio having a single color space component in the numerator and a single color space component in the denominator.

21. The apparatus of claim 14, wherein the chromaticity histogram is determined from chromaticity vectors represented as [x=x1/x3, y=x2/x3], where x1, x2 and x3 are color space components of pixels in the digital image.

22. The apparatus of claim 14, wherein different log likelihoods are estimated for different vectors (x,y), each log likelihood computed as $H(x,y) \otimes Q_{x_0,y_0}(x,y)$.

23. The apparatus of claim 22, wherein the vector having the best probability is selected as the white point.

24. The apparatus of claim 22, wherein the vectors having the best probabilities are selected as multiple white points.

25. The apparatus of claim 22, wherein the different vectors are based on prior knowledge of probabilities of plausible illuminants.

26. The apparatus of claim 14, wherein the processor uses the white point to perform color balancing on the digital image.

* * * * *